(12) United States Patent
Wacheux

(10) Patent No.: US 9,521,720 B2
(45) Date of Patent: Dec. 13, 2016

(54) SYSTEM FOR CONTROLLING THE SUPPLY OF POWER TO AND FOR THERMAL MANAGEMENT OF LIGHT SOURCES

(71) Applicant: Valeo Vision, Bobigny (FR)

(72) Inventor: Patrick Wacheux, Bois le Roy (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 14/794,980

(22) Filed: Jul. 9, 2015

(65) Prior Publication Data

US 2016/0014856 A1   Jan. 14, 2016

(30) Foreign Application Priority Data

Jul. 11, 2014   (FR) ..................... 14 56731

(51) Int. Cl.
H05B 37/00   (2006.01)
H05B 33/08   (2006.01)
H02H 5/04   (2006.01)

(52) U.S. Cl.
CPC .............. *H05B 33/083* (2013.01); *H02H 5/04* (2013.01); *H05B 33/0815* (2013.01); *H05B 33/0884* (2013.01)

(58) Field of Classification Search
CPC ..................................... F21K 9/52; G02B 6/00
USPC ..... 362/555, 613, 581, 800; 315/312, 185 R, 315/291
See application file for complete search history.

(56) References Cited

U.S. PATENT DOCUMENTS

| 8,878,443 B2 | 11/2014 | Luo et al. | |
|---|---|---|---|
| 2010/0231135 A1* | 9/2010 | Hum | H05B 33/0815 315/250 |
| 2011/0068701 A1 | 3/2011 | van de Ven et al. | |
| 2011/0204778 A1* | 8/2011 | Sadwick | H05B 33/0827 315/34 |
| 2012/0239326 A1* | 9/2012 | De Oto | H05B 33/0893 702/64 |
| 2012/0262074 A1* | 10/2012 | Wang | H05B 33/083 315/186 |
| 2014/0078773 A1* | 3/2014 | Curran | F21V 33/0008 362/555 |

FOREIGN PATENT DOCUMENTS

EP   2651186 A1   10/2013

* cited by examiner

*Primary Examiner* — Minh D A
(74) *Attorney, Agent, or Firm* — Jacox, Meckstroth & Jenkins

(57) ABSTRACT

A device and method for controlling the supply of power to light sources, in which a DC/DC converter is capable of delivering a voltage VMAX to the light sources. The forward voltage of the light sources depends on temperature and may temporarily exceed VMAX at low temperatures. The invention proposes means that allow the required forward voltage to be decreased automatically depending on a measurement of ambient temperature.

19 Claims, 2 Drawing Sheets

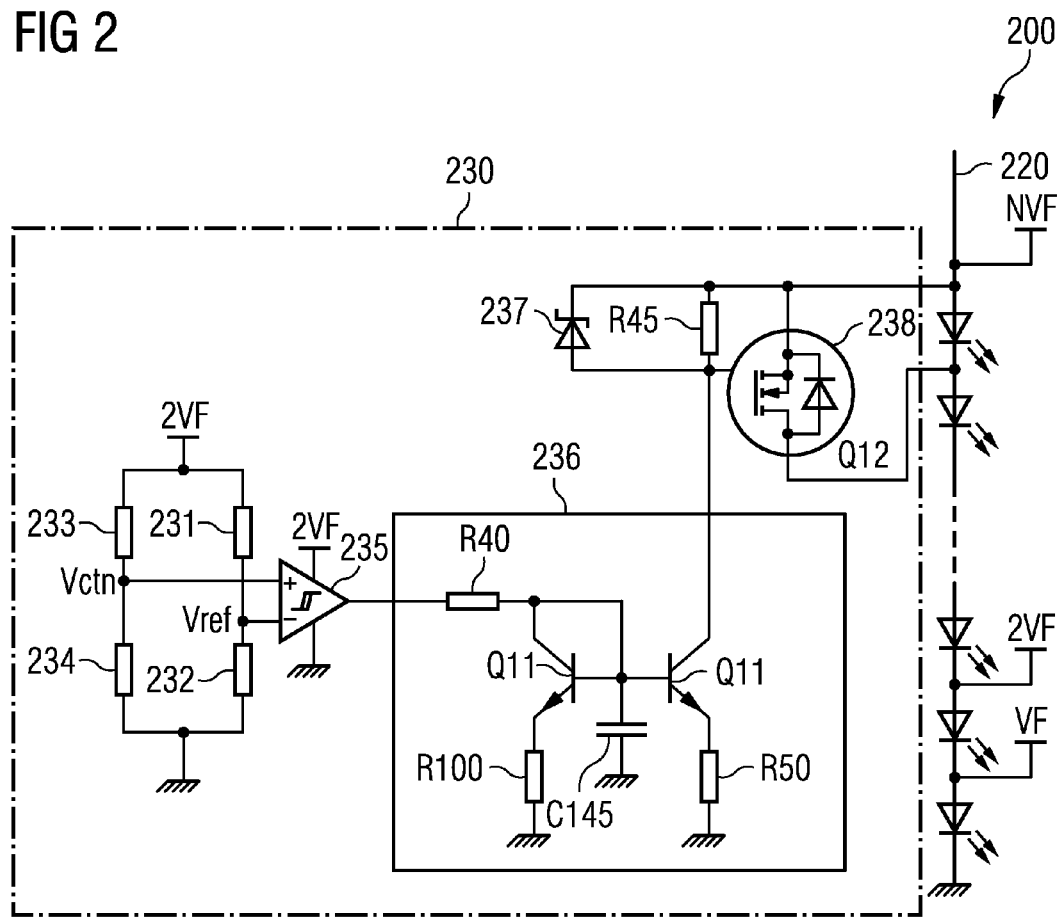

Figure 1:
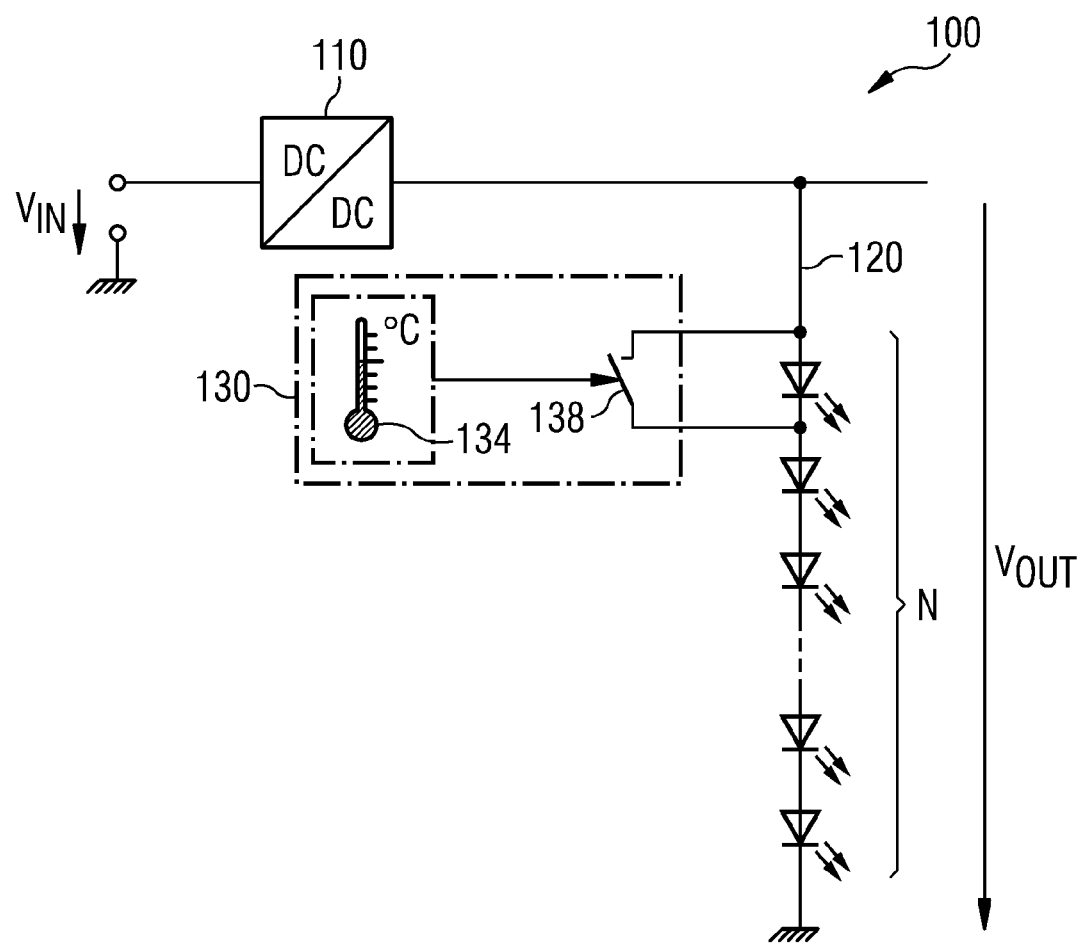

SYSTEM FOR CONTROLLING THE SUPPLY OF POWER TO AND FOR THERMAL MANAGEMENT OF LIGHT SOURCES

CROSS-REFERENCE TO RELATED APPLICATIONS

This application claims priority to the French application 1456731 filed Jul. 11, 2014, which application is incorporated herein by reference and made a part hereof.

BACKGROUND OF THE INVENTION

1. Field of the Invention

The invention relates to the field of the supply of electrical power to light sources. In particular, the invention relates to a system and method for controlling the supply of electrical power to and for thermal management of light sources and more precisely to light-emitting diodes (LEDs). The invention also relates to a luminous device for an automotive vehicle.

2. Description of the Related Art

A light-emitting diode (LED) is an electronic component capable of emitting light when an electrical current passes therethrough. The light intensity emitted by an LED is in general dependent on the magnitude of the electrical current passing therethrough. Inter-alia, an LED is characterized by a current magnitude threshold value. This maximum forward current generally decreases with increasing temperature. Likewise, when an LED is emitting light, a voltage drop equal to its forward voltage is observed across its terminals, which drop in general also decreases with increasing temperature. In the automotive field, recourse is increasingly being made to LED technology for various luminous signalling solutions. LEDs are used in order to provide luminous functions such as daytime running lights, signalling lights, etc. Whereas they are exposed to high operating temperatures, just after an automotive vehicle has been started up they operate at the ambient temperature of the vehicle. This temperature may especially reach negative temperatures.

It is known in the art to use a control circuit to control the supply of power to an assembly or group of LEDs. The circuit defines the voltage applied to a load arm comprising the group of LEDs connected in series. In the field of luminous devices for automotive vehicles, it is particularly important to be able to provide a constant luminosity in order to guarantee the safety of users of the vehicle and of other road users. In order to deliver a constant supply of power, known control circuits use various types of DC/DC converters to convert the DC voltage delivered for example by a car battery into a DC load voltage that is dependent on the number of LEDs to be supplied with power. The forward voltage of the LEDs is higher at low temperatures than at an ambient temperature of 25° C. or at the operating temperature of the LEDs. In general, a DC/DC converter is however dimensioned depending on the characteristics of the supplied LEDs at their operating temperature. Therefore, the situation may arise where the converter is not capable of delivering an electrical voltage level that is high enough to supply the load LEDs, when the latter have been cooled. This defect may be limited to a few volts.

It is known to approach this problem by dividing the assembly of LEDs supplied by the DC/DC converter into a plurality of independent arms, each arm comprising a dedicated current source. This solution is recommended if a large number of LEDs is to be supplied, and if a single arm containing all of the LEDs in series would lead to an overall forward voltage clearly higher than the maximum voltage that the converter can deliver. However, this solution is not suitable when the overall forward voltage only slightly exceeds at low temperatures the maximum voltage that the converter can deliver. Specifically, this solution consumes a lot of space on a printed circuit board and uses a lot of additional electrical components—at least one current source per arm.

Another known alternative is to share the power supply of a plurality of independent arms of LEDs over time. In the case of this time sharing, the DC/DC converter supplies each of the arms alternatively. This solution is feasible when a large number of LEDs is to be supplied, and when a single arm containing all of the LEDs in series would lead to an overall forward voltage clearly higher than the maximum voltage that the converter can deliver. However, this solution is also unnecessarily elaborate when the overall forward voltage only slightly exceeds at low temperatures the maximum voltage that the converter can deliver. Specifically, this solution requires a more complex and expensive power supply device in order to supply in alternation the various arms of LEDs.

SUMMARY OF THE INVENTION

The objective of the invention is to propose a system for controlling the supply of electrical power to light sources mitigating at least one of the drawbacks of the prior art. Another objective of the invention is to propose a method for controlling the supply of electrical power to light sources and a device for an automotive vehicle using the control system according to the invention.

One subject of the invention is a device for controlling the supply of power to light sources. The device comprises:
 a DC/DC converter capable of converting an input electrical voltage into an output electrical voltage; and
 a circuit mounted to load the converter, comprising a plurality of light sources mounted in series.

The device is noteworthy in that it furthermore comprises at least one switching circuit comprising switching means. The switching means are intended to short-circuit at least one of the light sources depending on a temperature measurement obtained by means for measuring ambient temperature.

For example, the circuit may comprise a switching means able to short-circuit one of the light sources. As a variant, the circuit for example comprises a switching means able to short-circuit a plurality of light sources. As another variant, the circuit for example comprises a plurality of switching means, each able to short-circuit one or more light sources.

Preferably, all the light sources of the circuit mounted to load the converter are mounted in series.

The converter may preferably comprise a boost type circuit, able to increase the voltage, and/or a buck type circuit, able to decrease the voltage. Alternatively, the converter may comprise a flyback type or even a sepic type circuit.

The switching circuit is preferably connected to the terminals of a light source or to the terminals of an assembly of light sources connected sequentially in series.

A plurality of switching circuits may alternatively be connected to the terminals of a plurality of light sources or to the terminals of a plurality of continuous assemblies of light sources.

Preferably, the light sources may be light-emitting diodes (LEDs) that are characterized, inter-alia, by their voltage drop, or forward voltage, VF.

The switching circuit may preferably be able to short-circuit at least one of the light sources only when the temperature measurement is below a temperature threshold.

The switching circuit may preferably be able to deactivate the short-circuit of at least one of the light sources only when the temperature measurement is above a temperature threshold. The temperature threshold may preferably be identical to the temperature threshold below which the short-circuit is formed by the switching circuit.

Advantageously, the plurality of LEDs may comprise a number N of LEDs, and the one or more switching circuits are able to short-circuit a number M<N of LEDs. In addition, at an ambient temperature below the temperature threshold, the overall voltage drop N*VF is preferably larger than the maximum electrical voltage VMAX that the converter is capable of delivering to the load circuit, whereas the voltage drop during a short-circuit, (N−M)*VF, is smaller than or equal to VMAX.

The temperature threshold is preferably below −10° C. or alternatively equal to below −15° C. It may even more preferably be below −15° C.

Preferably, the switching circuit may comprise an electrical circuit comprising a thermistor, the circuit being able to deliver two electrical voltage levels, the two levels being substantially equal when the ambient temperature is above the temperature threshold, and the two levels being different when the ambient temperature is below the temperature threshold.

The circuit may furthermore comprise a comparator element arranged so as to compare the two voltage levels delivered, and to control the state of a switching element able to short-circuit at least one light source depending on the result of the comparison.

Advantageously, the switching element is closed, thereby giving rise to short-circuiting of the LEDs across the terminals of which it is connected, when the two voltage levels are different, and therefore when the ambient temperature is below the temperature threshold. The switching element is opened when the two voltage levels are substantially equal, and therefore when the ambient temperature is above the temperature threshold.

The comparator element is preferably coupled to the switching element by way of a current mirror. Alternatively, the comparator element may be coupled directly in series to the switching element. Preferably, the comparator element may be coupled to a plurality of switching elements able to short-circuit a plurality of LEDs or a plurality of assemblies of LEDs.

The electrical circuit and the comparator element may preferably be supplied with the forward voltage of at least one of the light sources, VF, and preferably of at least two of the light sources, 2*VF. This feature makes it possible to avoid being inconvenienced by variations in VF.

Another subject of the invention is a luminous device for an automotive vehicle comprising at least one device for controlling the supply of power to light sources, especially providing a luminous signalling function of the automotive vehicle. The luminous device is noteworthy in that the control device is in accordance with the invention.

Another subject of the invention is a method for controlling the supply of power to light sources. The method comprises the following steps:
providing a DC/DC converter capable of converting an input electrical voltage into an output electrical voltage;
providing a circuit mounted to load the converter comprising a plurality of light sources mounted in series; and
selectively short-circuiting at least one of the light sources via at least one switching circuit depending on a temperature measurement obtained by means for measuring ambient temperature.

By virtue of the invention, it becomes possible to use a known DC/DC converter to supply with power an assembly of light sources, such as LEDs, temporarily at temperatures that are very low and clearly below the operating temperature of the LEDs. At such, especially negative, temperatures the LEDs require a higher forward voltage than at their operating temperature, whereas the converter has been dimensioned to supply them with power at their operating temperature. According to the invention, one or more LEDs are temporarily short-circuited automatically when a low temperature is detected. The saving in load voltage thus achieved is enough to allow the converter to supply most of the LEDs, which are not short-circuited. Supplying power to the non-short-circuited LEDs allows, via the heat generated thereby, the temperature of the printed circuit board that holds all of the LEDs to be rapidly increased to a temperature at which the converter is capable of supplying all of the LEDs. The short-circuit is automatically removed when a higher temperature is reached.

As the level of the forward voltage of the LEDs is used as a common voltage reference of the elements used by the invention, the proposed switching circuit is completely autonomous and does not require an additional power supply. In particular, the circuit does not require external control signals and activates automatically when a low temperature level, engendering a high voltage demand, is detected. The switching circuit may be implemented on a printed circuit board that comprises LEDs completely independently of the circuit for controlling the supply of power to the LEDs.

The invention employs standard components that are durable and inexpensive. It is implementable on the printed circuit board that holds the LEDs. The addition of the invention to a known device for controlling the supply of power to the LEDs is therefore achievable without a substantial loss of space.

Other features and advantages of the present invention will be better understood from the description and the drawings, which are shown merely by way of nonlimiting illustration of the invention, and in which:

BRIEF DESCRIPTION OF THE ACCOMPANYING DRAWINGS

FIG. 1 is a schematic illustration of a preferred embodiment of the system according to the invention; and FIG. 2 is a circuit diagram illustrating a preferred embodiment of a detail of the system according to the invention.

DETAILED DESCRIPTION OF THE PREFERRED EMBODIMENTS

Similar references are used to describe similar concepts that feature in a plurality of different embodiments. For example, the references 100 and 200 designate a device for controlling the supply of power to a light source according to the invention according to two separate embodiments.

FIG. 1 schematically illustrates a device 100 for controlling the supply of electrical power according to one embodiment of the invention. A converter 110, which may be a buck or boost type converter, or a combination of buck and boost converters, is capable of converting an input DC voltage, VIN, delivered by a source (not illustrated), into an output DC voltage VOUT. In other embodiments of the invention, the converter 110 may conform to an alternative architecture, many variants being known in the art, such as for example the flyback architecture or SEPIC (single-ended primary-inductor converter) architecture. A load circuit 120, illustrated by way of example by a number N of light-emitting diodes (LEDs) connected in series, is supplied with power using the converter 110. The load circuit or arm 120 may comprise other light sources instead of LEDs without nonetheless departing from the scope of the invention. It is assumed in order to make the description clearer that the LEDs are characterized by a common forward voltage VF. The connection in series of N LEDs therefore induces a voltage drop of N*VF volts across the ends of the load arm 120.

According to the invention, the device 100 furthermore comprises at least one switching circuit 130, which is able to short-circuit at least one of the light sources or LEDs of the load circuit 120. In the illustrated example, a single LED may be short-circuited by the circuit 130 since the latter is connected directly across the terminals of one LED. The same circuit 130 may however be connected across the ends of a series of LEDs of the load arm 120. Alternatively, a plurality of equivalent switching circuits 130 may be arranged across the terminals of a plurality of LEDs of the load arm 120, or across the ends of a plurality of series of LEDs of the load arm 120. The switching circuit 130 comprises switching means 138 and means 134 for measuring ambient temperature, arranged so as to control the state of the switching means 138. The switching means 138 is opened and closed depending on the temperature measured by the measuring means 134. In particular, the switch is opened when the temperature is above a temperature threshold. In this case, no LED is short-circuited and the converter 110 supplies all of the N LEDs with power. If in contrast the measured temperature is below a temperature threshold, the switching means 138 are closed, thereby short-circuiting the one or more LEDs to which the circuit 130 is applied. If the number of LEDs implicated is equal to M<N, short-circuiting M LEDs implies that the converter 110 then needs to supply only M-N LEDs of the arm.

The temperature threshold is preferably chosen depending on the maximum temperature VMAX that the converter 110 can deliver, and depending on the overall forward voltage N*VF of the load arm 120. The latter quantity depends on temperature and it is higher at low temperatures than at high temperatures. A person of ordinary skill in the art will be able to adapt the temperature threshold when he observes that at a given temperature, the required voltage N*VF becomes slightly higher than VMAX, whereas the required voltage after short-circuiting of M LEDs, (N−M)*VF, is lower than or equal to VMAX. By adjusting the temperature in accordance with this observation, the arrangement according to invention makes it possible to ensure that the voltage level required by the arm 120 does not exceed the maximum voltage VMAX that the converter 110 is capable of delivering. Below the temperature threshold, when the required voltage is higher than VMAX, a restricted but sufficient number M of LEDs is short-circuited by the circuit 130, thereby decreasing the required voltage by M*VF volts to a level lower than or equal to VMAX. The LEDs supplied with power rapidly heat the printed circuit board on which they are mounted, thereby increasing the ambient temperature, and thereby engendering a decrease in the voltage required by the arm 120. Once the temperature threshold is reached, the converter 110 is able to supply all of the N LEDs with power, and the short-circuit is automatically lifted. As the effect of the short-circuit is of short duration and only involves a restricted number of LEDs, the temporary reduction in the luminosity emitted by the arm 120 is in general not perceptible to the human eye.

The control device 100 according to the invention is particularly applicable to a luminous device for an automotive vehicle. The converter 110 is then supplied with power by an internal current source of the automotive vehicle, such as the battery of the automotive vehicle. The light sources supplied with power by way of the control device 100 preferably provide a luminous signalling function of the automotive vehicle. In such a case of application, the temperature threshold is advantageously below −10° C. and preferably below −15° C.

This describes generally the operation of the device 100 and the main steps of the method according to the invention. An actual embodiment is illustrated in and described with reference to FIG. 2, without however limiting the protection to the embodiment given. On the basis of the principles described and the example given, a person of ordinary skill in the art will be able to implement and/or adapt the invention depending on the circumstances. The technical features described for the one given embodiment are applicable to other embodiments of the invention, unless otherwise indicated. In the described embodiment, light-emitting diodes are used by way of exemplary light sources.

FIG. 2 shows the diagram of an electronic circuit implementing a device 200 for controlling the supply of power according to one embodiment of the invention. The electronic components and operation of the converter (not illustrated) will not be explained in detail in the context of the present description since DC/DC converters are known per se in the art. A load circuit 220 comprises N LEDs to be supplied with power by the converter. In the embodiment illustrated, a switching circuit 230 comprises an arrangement comprising two parallel arms that are connected to a reference voltage, 2*VF for example, and to ground. The first arm comprises a resistor 233 mounted in series with a thermistor 234 that implements the means for measuring temperature. The second arm comprises a series arrangement of two resistors 231, 232. Preferably, the resistance of the thermistor 238 decreases when temperature increases. The arrangement is therefore capable of delivering two different voltage levels, Vctn and Vref, one of which Vctn depends on the behavior of the thermistor and therefore on the ambient temperature. The thermistor is chosen so that it has a high resistance below the temperature threshold described above. Preferably, the resistances of the resistor and thermistor are chosen so that the two voltage levels are substantially equal when the ambient temperature is above the temperature threshold, and different when the ambient temperature is below the value of the temperature threshold.

The switching circuit 230 furthermore comprises a comparator element 235 that serves to compare the two voltage levels Vctn and Vref. The output of the comparator indicates a "high" logic level at equal inputs, and a "low" logic level at different inputs. When the ambient temperature is below the threshold value, the two compared voltage levels are different and the comparator indicates a high output level. The output of the comparator 235 is connected to a transistor 238 by way of a current mirror 236. The high level of the comparator 235 is able to close the switching means implemented by the transistor 238 and thereby short-circuit the LED. The use of the current mirror 236 furthermore allows the circuit 230 to be connected anywhere on the arm 220, except to the last two LEDs of the series arrangement. Specifically, the voltage across the terminals thereof advantageously serves as a reference voltage for the switching circuit 230.

When the temperature increases above the threshold value, the voltages Vctn and Vref become substantially equal, thereby dropping the output of the comparator 235 to the low level. Therefore, the switching means 238 are opened and the short-circuit is lifted. A Zener diode 237 is preferably used in order to provide the gate of the transistor with voltage protection, the transistor preferably being a MOSFET. A person of ordinary skill in the art could modify the circuit described in order to connect the comparator 235 to a plurality of switching means 238 acting on a plurality of LEDs.

Using the description given, a person of ordinary skill in the art will be able to modify the electronic circuits described and create alternative circuits implementing similar functions without however departing from the scope of the present invention.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A device for controlling the supply of power to light sources, comprising:
   a DC/DC converter capable of converting an input electrical voltage into an output electrical voltage;
   a circuit mounted to load said converter comprising a plurality of light sources mounted in series;
   wherein said device furthermore comprises at least one switching circuit comprising switching means intended to short-circuit at least one of said plurality of light sources depending on a temperature measurement obtained by means for measuring ambient temperature;
   wherein said at least one switching circuit comprises:
   an electrical circuit comprising a thermistor, said electrical circuit being able to deliver two electrical voltage levels, said two electrical voltage levels being substantially equal when the ambient temperature is above said temperature threshold, and said two electrical voltage levels being different when the ambient temperature is below said temperature threshold.

2. The device according to claim 1, wherein said converter comprises at least one of a boost type circuit, able to increase the voltage, or a buck type circuit, able to decrease the voltage.

3. The device according to claim 2, wherein said plurality of light sources are light-emitting diodes (LEDs), characterized, inter-alia, by their voltage drop, or forward voltage, VF.

4. The device according to claim 2, wherein said at least one switching circuit is able to short-circuit at least one of said plurality of light sources only when said temperature measurement is below a temperature threshold.

5. The device according to claim 1, wherein said plurality of light sources are light-emitting diodes (LEDs), characterized, inter-alia, by their voltage drop, or forward voltage, VF.

6. The device according to claim 5, wherein:
   said plurality of LEDs comprises a number N of LEDs; and
   said at least one or more switching circuits are able to short-circuit a number M<N of LEDs; and in that
   at an ambient temperature below said temperature threshold, the overall voltage drop N*VF is larger than the maximum electrical voltage VMAX that said converter is capable of delivering to said load circuit, whereas the voltage drop during a short-circuit (N−M)*VF, is smaller than or equal to VMAX.

7. The device according to claim 5, wherein said at least one switching circuit is able to short-circuit at least one of said plurality of light sources only when said temperature measurement is below a temperature threshold.

8. The device according to claim 1, wherein said at least one switching circuit is able to short-circuit at least one of said plurality of light sources only when said temperature measurement is below a temperature threshold.

9. The device according to claim 4, wherein said temperature threshold is below −10° C. and preferably below −15° C.

10. The device according to claim 1, wherein said at least one switching circuit furthermore comprises a comparator element arranged so as to compare said two electrical voltage levels delivered, and to control the state of a switching element able to short-circuit at least one light source depending on the result of the comparison.

11. The device according to claim 10, wherein said comparator element is coupled to said at least one switching element by way of a current mirror.

12. The device according to claim 10, wherein said electrical circuit and said comparator element are supplied with the forward voltage of at least one of said plurality of light sources, VF, and preferably of at least two of said plurality of light sources, 2*VF.

13. A luminous device for an automotive vehicle comprising at least one device for controlling the supply of power to light sources, especially providing a luminous signalling function of the automotive vehicle, wherein said control device is in accordance with claim 1.

14. A method for controlling the supply of power to light sources, comprising steps of:
   providing a DC/DC converter capable of converting an input electrical voltage into an output electrical voltage;
   providing a circuit mounted to load said converter comprising a plurality of light sources mounted in series;
   selectively short-circuiting at least one of said plurality of light sources via at least one switching circuit depending on a temperature measurement obtained by means for measuring ambient temperature;
   providing said at least one switching circuit with an electrical circuit comprising a thermistor; and
   delivering two electrical voltage levels by said electrical circuit, said two electrical voltage levels being substantially equal when the ambient temperature is above said temperature threshold, and said two electrical voltage levels being different when the ambient temperature is below said temperature threshold.

15. A device for controlling the supply of power to light sources, comprising:
   a DC/DC converter capable of converting an input electrical voltage into an output electrical voltage;
   a circuit mounted to load said converter comprising a plurality of light sources mounted in series;
   wherein said device furthermore comprises at least one switching circuit comprising a switch intended to short-circuit at least one of said plurality of light sources depending on a measurement of an ambient temperature;

wherein said at least one switching circuit comprises:
an electrical circuit comprising a thermistor, said electrical circuit being able to deliver two electrical voltage levels, said two electrical voltage levels being substantially equal when the ambient temperature is above said temperature threshold, and said two electrical voltage levels being different when the ambient temperature is below said temperature threshold.

16. The device according to claim 15, wherein said converter comprises at least one of a boost type circuit, able to increase the voltage, or a buck type circuit, able to decrease the voltage.

17. The device according to claim 15, wherein said plurality of light sources are light-emitting diodes (LEDs), characterized, inter-alia, by their voltage drop, or forward voltage, VF.

18. The device according to claim 15, wherein said at least one switching circuit is able to short-circuit at least one of said plurality of light sources only when said temperature measurement is below a temperature threshold.

19. The device according to claim 15, wherein:
said plurality of LEDs comprises a number N of LEDs; and
said at least one or more switching circuits are able to short-circuit a number M<N of LEDs; and in that
at an ambient temperature below said temperature threshold, the overall voltage drop N*VF is larger than the maximum electrical voltage VMAX that said converter is capable of delivering to said load circuit, whereas the voltage drop during a short-circuit (N−M)*VF, is smaller than or equal to VMAX.

\* \* \* \* \*